United States Patent

[11] 3,550,539

| [72] | Inventor | Robert W. LaWarre<br>Lima, Ohio |
|---|---|---|
| [21] | Appl. No. | 822,135 |
| [22] | Filed | May 6, 1969 |
| [45] | Patented | Dec. 29, 1970 |
| [73] | Assignee | Beatrice Foods Co.<br>Chicago, Ill.<br>a corporation of Delaware |

[54] TUBE EXTRUDING DIE
6 Claims, 2 Drawing Figs.

[52] U.S. Cl. .................................................. 107/14, 107/54
[51] Int. Cl. ........................................ A21c 11/16
[50] Field of Search .......................................... 107/1, 1.4, 14, 14.6, 14.7; 99/238; 18/12, 13

[56] References Cited
UNITED STATES PATENTS

| 2,217,135 | 10/1940 | Parrish et al. ................. | 107/14 |
| 2,838,011 | 6/1958 | Braibanti et al. ............. | 107/14 |
| 3,402,682 | 9/1968 | Peden et al. ................... | 107/14 |

FOREIGN PATENTS

| 983,383 | 2/1951 | France ......................... | 107/14.7 |

*Primary Examiner*—Henry S. Jaudon
*Attorney*—Cushman, Darby & Cushman

ABSTRACT: There is provided a process and apparatus for forming a continuous tubular-shaped mass by successively compressing and expanding the mass after passing through a mechanical support for holding a plug disposed in an annular die, which annulus forms the tubular shape.

PATENTED DEC29 1970   3,550,539

SEAL FACE

STATOR

INVENTOR
ROBERT W. LaWARRE
BY
Cushman, Darby, Cushman
ATTORNEYS

TUBE EXTRUDING DIE

The present invention relates to a die for extruding a tubular-shaped mass.

When a mass is extruded in a tubular shape, it is common in the art to provide a die having an annular opening which will, of course, allow the extrusion of a tubular-shaped mass. Also commonly, the annular die is constructed by providing an orifice having a concentrically positioned solid plug therein so that an annular space between the orifice and plug is provided for forming the mass into a tubular shape. Obviously, however, the plug must be mechanically supported in the orifice and that requirement results in difficult problems to be overcome, especially when certain materials are being extruded into tubular shapes. For example, when food products, e.g. corn meal, is extruded into a tubular shape and subsequently chopped by a revolving knife blade to form rings e.g. onion flavored rings, it is difficult to extrude a continuous tubular mass without breaks or discontinuities in the tubular form with existing dies. This is because the mechanical supports for the plug, noted above, disrupt the flow of the mass when the mass passes around the supports and the disrupted mass fails to fully reunite (knit) again into a continuous form. Of course, if a very long flow path downstream of the mechanical supports for the plug is provided, the mass will have a greater opportunity to reunite, but such a long path is not practical since the plug would therefore have to be mechanically unsupported for too great a distance and the plug therefore vibrates in the orifice, resulting in nonuniform wall thickness of the extruded tubular mass.

Many attempts have been made in the art to overcome this problem. Hence, the U.S. Pat. No. 3,045,281 of July 24, 1962, discloses a die in which plastic material is forced through holes into an expanded area in the die and then out through holes into an expanded area in the die and then out through a restricted nozzle to form an annular cover on a woven tube, the tube being fed through the center of the die. The Carter et al. U.S. Pat. No. 3,303,247 of Feb. 7, 1967, relates to an extrusion head in which there is a surge chamber to reduce the possibility of strains or imperfections in the material being extruded. The Parrish, Jr., et al. U.S. Pat. No. 2,217,135 of Oct. 8, 1940, illustrates an extruder die provided with a plate having holes which supports the central portion of the die. The Nelson, et al. U.S. Pat. No. 3,196,809 of July 27, 1965, discloses an extrusion nozzle for ice cream and the like in which the outer portion of the extrudant is fed from a restricted nozzle into an expansion area and is then passed through another restriction to its final form. The Graves U.S. Pat. No. 2,853,027 of Sept. 23, 1958, discloses a food processing machine in which a die is used to produce corn meal sticks or collets, in which the meal is forced through a series of restriction and expansion sections in the die. However, rather than forming an annular ring, there are a series of individual outlets in the face of the die. All of these attempts of the prior art are not fully satisfactory for producing continuous tubular shapes of mass which do not readily reunite after a disruption in the flow path, especially food products such as cereal meals.

Accordingly, it is an object of the present invention to provide a method and apparatus for forming a tubular shape which will produce a continuous (nondiscontinuous) tubular shape. Other objects will be apparent from the following disclosure and claims.

Broadly, speaking, according to the present invention, there is provided an annular die which does not have any mechanical supports in the tubular forming section of the die, but provides a plurality of alternating expansion and compression zones immediately before and in the tubular forming die whereby reuniting of the flowing mass is accomplished. More particularly, the plug of the annular die is supported by a plug plate positioned between the die and a seal face. The plug plate has a plurality of bores provided just before the tubular forming zone of the die and the die is provided with expansion and compression zones before and in the tubular forming zone.

The invention will be fully explained in connection with the drawings where:

Figure 1:
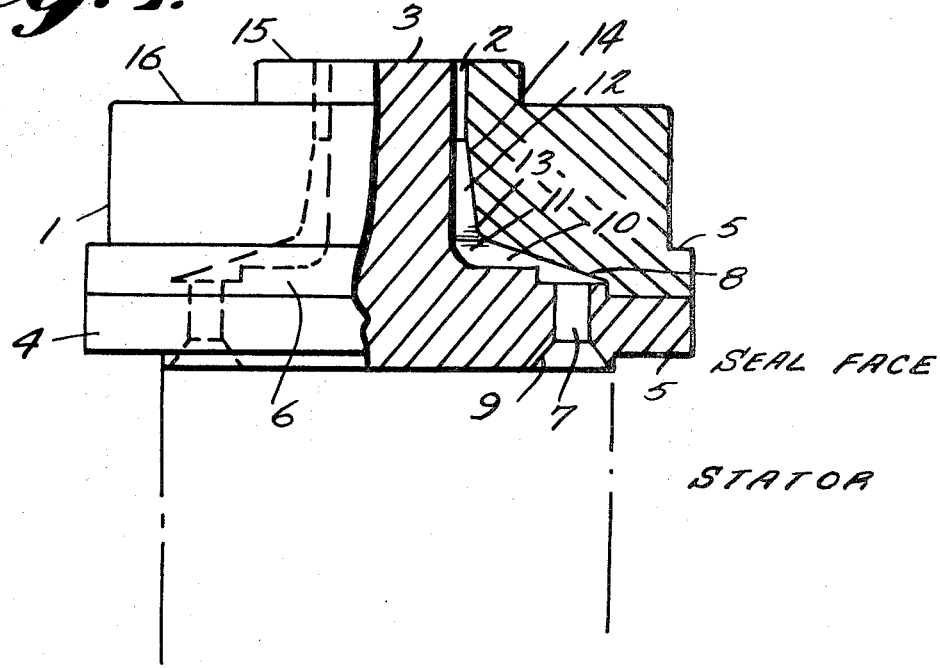
FIG. 1 is an elevation, partly in cross section, of the present die.
Figure 2:
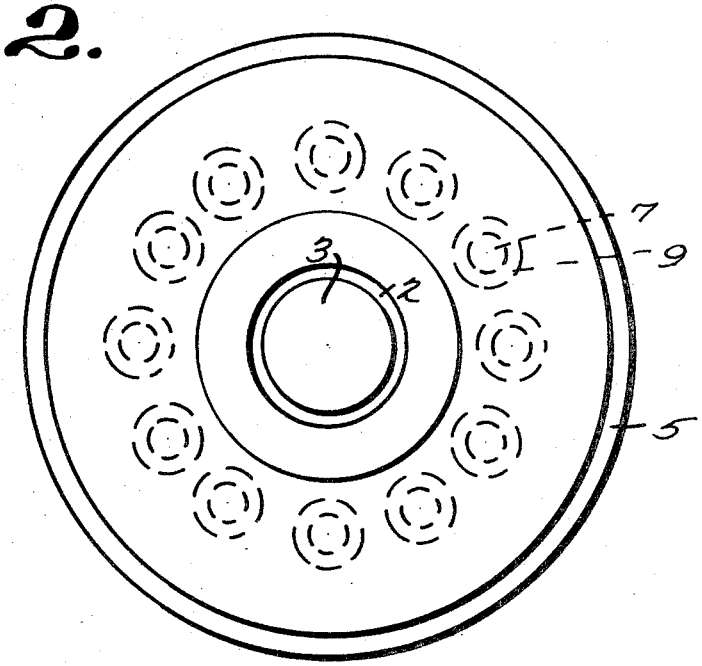
FIG. 2 is a plan view of the die of FIG. 1.

As can be seen from the FIGS. there is provided a die block 1, having a die bore 2. Concentrically disposed in die bore 2 is a plug 3. Plug plate 4 abuts the end of die block 1 at the junction thereof and the assembly is held together by a clamp ring 5 of conventional design. Plug 3 has a plug base 6 of greater diameter than the plug. The total assembly is attached to an extruder discharge (the extruder and the discharge thereof being as desired) in a conventional manner, e.g. bolts. Plug 3 is attached to plug base 6 either by bolts, screws, welding, etc. (not shown) in a conventional manner or plug 3 and plug plate 5 may be formed as a continuous unit (as shown) by casting, machining etc. Plug plate 4 has a plurality of bores 7 for the passage of product therethrough and these bores 7 empty into expansion chambers 8 in the plug base 6, the chambers 8 being of greater volume than the bores 7 and having at one point a greater cross-sectional area than bores 7, e.g. 1.2 times to 2 times, especially 1.3 times to 1.7 times as great in volume and cross-sectional area. Bores 7 have a tapered entrance 9 to provide a smooth flow of product from the extruder discharge to bores 7. A restricting zone 10 is formed between plug base 6 and die block 1, followed by an expansion zone 11 between the same two members. Here again, the volume and cross-sectional area of the restriction zone 10 is less than the volume of chambers 8, e.g. from 0.3 times to 0.85 times, especially from 0.4 times to 0.8 times less in volume and cross-sectional area and similarly expansion area 11 is from 1.2 times to 2 times greater in volume and cross-sectional area than restriction zone 10. However, zone 11 must also be greater in volume and cross-sectional area than zone 8. From expansion zone 11, an annular space, generally 12, between die block 1 and plug 3 is provided and this is the tubular forming zone. The annular space is decreasingly tapered between points 13 and 14, e.g. a decrease in the distance between the die block 1 and plug 3 of from about 15 percent to 75 percent, especially about 25 percent to 60 percent, which provides a further restriction zone. From point 14 to the orifice exit 2, the annular space is essentially uniform.

As can be seen from the above, the invention provides a method of extruding a uniform tubular shaped mass by feeding a pressurized mass into and through a series of restricting and expansion zones, e.g. through a first restricting zone (apertures 7), a first expansion zone (chambers 8), a second restricting zone 10, a second expansion zone 11, a third restricting zone 12 of increasing degree of restriction (the taper between points 13 and 14) and then through an annular space of essentially uniform cross section (from point 14 to the exit of the die 2). However, basic to the above is the arrangement the mass to be shaped does not encounter any disruptive mechanical obstructions after passing through the first restricting zone. i.e. the apertures 7. This is because the plug, concentrically disposed in the die bore is rigidly attached to the plug plate, which abuts the entrance of the die bore (the plug terminating essentially at the discharge of the die bore) and the only mechanical obstructions are the apertures (bores) 7 which are removed from the tubular forming zone. By this arrangement the disruption caused by the bores (apertures) 7 is effectively mitigated by the mixing and knitting action of the successive expansion and restriction zones followed by a smooth restriction zone (the tapered portions) and a uniform annular space.

As noted above, the extrusion of food products, e.g. cereal meals is exceptionally difficult and the present die is especially suited therefor. Also in connection with food products, it is preferred to have a raised exit end 15 of the die for cooling and air circulation about the orifice to prevent burning of the shaped food products. For example, the raised portion should be from about one eighth inch to three quarter inch, especially one quarter inch to one half inch above the die block face 16. This raised portion should have an outside diameter about 1.15 to 2.25 times, especially about 1.2 to 1.8 times the diameter of the orifice 2 of die block 1. At any rate, the raised portion should be arranged so that the temperatures of the orifice face 17 will not exceed the burning temperatures of the food product, e.g. about 325° to 450° F. for cereal meals.

Also for general purposes with cereal meals, the successive expansion and restriction zones should be sized so that the meal is expanded about 1.2 to 2 times the previous volume in the prior restriction zone and compressed in the restriction zone about 0.5 to 0.8 of the previous expanded volume. However, as shown above, the volume and cross-sectional area of a succeeding expansion zone should be greater than a prior expansion zone, in reference to the flow direction of the meal through the die.

The particular extruding device and conditions are not critical to the present invention and may be as desired, e.g. to accomplish temperatures from room temperature up to 450° F. and pressures from about 5 p.s.i.g. to 300 p.s.i.g. For suitable conditions for cereal meals, see U.S. Pat. Nos. 2,915,957 and 3,104,975 to Bowman, which disclosures are incorporated herein by reference.

Food products which may be used with the present invention include cereal products (corn, wheat, maze, etc. fish or other sea food, meat and starches such as potato starch.

I claim:

1. A die for extruding a continuous and uniform tubular-shaped mass comprising a die block having a die bore therein, a plug concentrically disposed in the said die bore and being rigidly attached to a plug plate, the said plug plate abutting the entrance end of the said die bore and the said plug terminating essentially at the discharge end of the die bore, said plug plate having a plurality of apertures therethrough for receiving and passing of the mass to be shaped, said apertures being a first restriction zone, said first restriction zone being in communication with a first expansion zone of greater volume and cross section than the said first restriction zone, the said first expansion chamber communicating with a second restriction zone of less cross section and volume than the first expansion zone, said second restriction zone communicating with a second expansion zone of greater volume and cross section than said second restriction zone, said expansion zone communicating with a third restriction zone wherein the restriction zone gradually increases in the degree of restriction, said third restriction zone communicating with an annular space of essentially uniform cross section, and wherein a mass passing through the die encounters no mechanical obstructions after passing through the apertures forming the said first restriction zone.

2. A die according to claim 1 wherein the expansion zones expand the mass from about 1.2 to 2 times the prior volume and the restriction zones compress the mass to about 0.5 to 0.8 times the prior volume.

3. A die according to claim 2 wherein an annular space is formed between the said die block and the said plug and a raised portion of the die block is provided at the exit end of the annular space, said raised portion being about one-eighth inch to three-quarter inch above the die block face.

4. The die of claim 3 wherein the said raised portion has an outside diameter about 1.15 to 2.25 times greater than the greater diameter of the said annular space.

5. A method of extruding a continuous and uniform tubular-shaped mass comprising feeding a pressurized mass into:
   A. A first restricting zone;
   B. Then into a first expansion zone;
   C. then into a second restricting zone;
   D. then into a second expansion zone;
   E. then into a third restricting zone, wherein the third restricting zone gradually increases in the degree of restriction; and
   F. then through an annular space of essentially uniform cross section, and wherein the mass encounters no disruptive mechanical obstructions after passing through the first restricting zone.

6. The method of claim 5 wherein the expansion zones expand the mass from about 1.2 to 2 times the prior volume and the restriction zones compress the mass about 0.5 to 0.8 times the prior volume.